(12) United States Patent
Ikeda

(10) Patent No.: US 6,390,248 B1
(45) Date of Patent: May 21, 2002

(54) DUAL MODE DRUM BRAKE DEVICE

(75) Inventor: Takashi Ikeda, Owariasahi (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/506,029

(22) Filed: Feb. 17, 2000

(51) Int. Cl.[7] .............................................. F16D 51/00
(52) U.S. Cl. .............................. 188/79.55; 188/79.54; 188/328; 188/342; 188/79.61
(58) Field of Search ........................ 188/78, 325–328, 188/341, 342, 79.51, 79.54, 79.55

(56) References Cited

U.S. PATENT DOCUMENTS

| | | | | |
|---|---|---|---|---|
| 3,216,534 A | * | 11/1965 | Chouings et al. ........... | 188/79.5 |
| 3,323,618 A | * | 6/1967 | Riddy ........................ | 188/79.5 |
| 3,583,532 A | * | 6/1971 | Hodkinson ................. | 188/79.5 |
| 3,719,258 A | * | 3/1973 | Margetts .................... | 188/79.5 |
| 3,811,537 A | * | 5/1974 | Margetts .................... | 188/79.5 |
| 3,874,481 A | * | 4/1975 | Margetts .................... | 188/79.5 |
| 4,079,819 A | * | 3/1978 | Shirai et al. ................ | 188/327 |
| 4,139,083 A | * | 2/1979 | Hoshino et al. ........... | 188/79.5 |
| 4,270,632 A | * | 6/1981 | Langert ..................... | 188/79.5 |
| 4,387,792 A | * | 6/1983 | Imamura ................... | 188/328 |
| 4,480,726 A | * | 11/1984 | Idesawa .................... | 188/79.5 |
| 4,887,698 A | * | 12/1989 | Hunt et al. ................. | 188/325 |
| 5,058,713 A | * | 10/1991 | Evans ........................ | 188/79.54 |
| 5,099,967 A | * | 3/1992 | Lang ......................... | 188/328 |
| 5,193,653 A | * | 3/1993 | Carr .......................... | 188/79.55 |
| 5,275,260 A | * | 1/1994 | Evans et al. .............. | 188/79.64 |
| 5,538,112 A | * | 7/1996 | Last .......................... | 188/79.54 |
| 5,720,367 A | * | 2/1998 | Evans ....................... | 188/79.64 |
| 5,924,529 A | * | 7/1999 | Ikeda et al. ................ | 188/331 |
| 6,003,645 A | * | 12/1999 | Asai et al. .................. | 188/328 |
| 6,062,353 A | * | 5/2000 | Asai et al. .................. | 188/325 |
| 6,082,505 A | * | 7/2000 | Asai et al. ................ | 188/79.54 |
| 6,125,976 A | * | 10/2000 | Asai et al. .................. | 188/328 |
| 6,131,708 A | * | 10/2000 | Fujiwara ................. | 188/250 E |

\* cited by examiner

Primary Examiner—Robert J. Oberleitner
Assistant Examiner—Benjamin A. Pezzlo
(74) Attorney, Agent, or Firm—Liniak, Berenato, Longacre & White

(57) ABSTRACT

It is an object of this invention to provide a drum brake device which solves a problem of decreasing the strength of a back plate near an anchor block and reduces potential damage to the parking brake cable. A pivot lever 60 is pivotally mounted on one brake shoe 20. Upper and lower portions of the pivot lever functionally engage with the other brake shoe 30 via struts 81, 70. A parking brake actuator 90 which pivotally supports on the upper strut 81 and activates upon an activation of a parking brake is arranged to be adjacent to a service brake actuator which activates upon an activation of a service brake. Preferably an operational part of the parking brake actuator is projected out from the brake back plate.

22 Claims, 9 Drawing Sheets

DUAL MODE DRUM BRAKE DEVICE

BACKGROUND OF INVENTION

This invention relates to a dual mode drum brake device which functions as a leading trailing type (LT type) when a service brake is applied and functions as a duo servo type (DS type) when a parking brake is applied. This type of drum brake device has been disclosed for example by the U.S. Pat. No. 5,070,968, the descriptions of which are incorporated herein by reference.

A conventional dual mode drum brake device is explained with reference to FIGS. 8 and 9. Such a conventional device comprises a pair of brake shoes b, c which are mounted on a back plate a; a hydraulic cylinder e which is arranged between the upper side of the brake shoes b, c in order to pressurize the brake shoes b, c to spread them open with an anchor block d as the fulcrum; a pivot lever f which is pivotally superimposed under the left brake shoe b; a shoe clearance adjustment device g adjacent to the hydraulic cylinder e which is extended between both brake shoes b, c and functionally engages with the upper portion of the pivot lever f and the right brake shoe c; a strut h adjacent to the anchor block d, which is extended between both brake shoes b, c; and a brake lever i which engages with the lower portion of the pivot lever f and the left side of the strut h.

The strut h is spread into two forked legs toward its left end. The brake lever i is pivotally mounted on one of forked legs at a side adjacent the back plate a. A parking brake is designed to be activated by pulling a parking brake cable j connected with the end of the brake lever i.

However, the above-described conventional dual mode drum brake device has the following points which need to be improved.

A through hole for the parking brake cable j needs to be formed near the anchor block d. However, this portion of the back plate needs to have the highest strength among other portions of the back plate a. Yet, securing the through hole possibly reduces the strength of the back plate a. Due to the decreased strength of the back plate a, there is a need for a supplemental means to increase the strength of the back plate a, e.g., by adding a reinforcing plate or designing the back plate a to be thicker. However, adding the supplemental means and designing the back plate a to be thicker raise the weight and cost of the device.

The parking brake cable j is arranged at the lower portion of the back plate a. Hence, as the position where the parking brake cable j is arranged comes closer to the road surface, it becomes more likely to be damaged by being hit by flying gravel or by colliding with obstacles on the road surface.

The entire brake lever i is to be located inside the brake device, and a cable end k of the parking brake cable j must be pre-connected with the brake lever i. These requirements make the connecting work more difficult and the handling of the brake device more inconvenient.

SUMMARY AND OBJECTIVE OF THIS INVENTION

This invention was made to improve the above points and to that end this invention provides a dual mode drum brake device which does not have a reduced strength of the back plate near the anchor block and which does not have the need for a supplemental means to increase the strength of the back plate.

Another aspect of this invention is to provide a dual mode drum brake device which enables a design of the arrangement of the parking brake cable away from the road surface, thereby minimizing the possibility of damage to the parking brake cable.

This invention is a dual mode drum brake device, in which a pair of brake shoes are provided on a back plate to face each other; a service brake actuator which is adapted to be activated upon an activation of a service brake is arranged between adjacent upper facing ends of the brake shoes; an anchor block is arranged between adjacent lower facing ends of the brake shoes; a pivot lever is arranged such that a central region of said pivot lever is pivotally mounted at a central region of one of the brake shoes; a shoe clearance adjustment device is arranged adjacent to the service brake actuator and extends between the pair of brake shoes and functionally engages the upper portion of the pivot lever; a strut is extended between the lower portion of the pivot lever and the other one of the brake shoes and functionally engages with the lower portion of the pivot lever; and the brake shoes are designed to be able to spread open upon an activation of a parking brake, wherein: a parking brake actuator which is adapted to activate upon the activation of the parking brake is arranged adjacent to the service brake actuator; and an operating portion of the parking brake actuator extends outside the brake through the back plate.

This invention further is a dual mode drum brake device as above, wherein the operating portion of the parking brake actuator which activates upon the activation of the parking brake is arranged to be movable in an almost right angle relative to the back plate.

This invention still further is a dual mode drum brake device as above, wherein the operating portion of the parking brake actuator which activates upon the activation of the parking brake is arranged to be movable almost parallel to the back plate.

This invention still further is a dual mode drum brake device as above, wherein a cushioning member is arranged between the anchor block and the brake shoes.

This invention still further is a dual mode drum brake device as above, wherein a protuberance is integrally formed by pressing on the central region of the pivot lever or on the central region of the one of the brake shoes; and the protuberance is pivotally supported in a hole which is provided on the other of the pivot lever or the one of the brake shoes.

This invention still further is a dual mode drum brake device as above, wherein when a central pivot section of the pivot lever is a pivot point, a resistance force against the opening of the brake shoes during a parking brake operation is designed to be greater on a side of the brake shoes adjacent the anchor block than on a side of the brake shoes adjacent the service brake actuator.

This invention still further is a dual mode drum brake device as above, wherein the shoe clearance adjustment device extended between the brake shoes is adapted to automatically extend when sensing an excessive amount of opening of the pair of brake shoes during a service brake operation and to adjust clearance between a brake drum and linings of the brake shoes.

This invention yet further is a dual mode drum brake device as above, wherein the strut extended between the lower portion of the pivot lever and the lower portion of the other one of the brake shoes is adapted to automatically extend when sensing an excessive amount of opening of the pair of brake shoes and the pivot lever during service brake operation and to adjust an application stroke of the parking brake actuator.

BRIEF DESCRIPTION OF THE DRAWINGS

The above and other aspects and the attendant advantages of the present invention will become readily apparent by reference to the following detailed description when considered in conjunction with the accompanying drawings wherein.

DETAILED DESCRIPTION OF THIS INVENTION

Embodiment 1

Embodiment 1 of this invention is explained with reference to FIGS. 1–6.

Figure 1:
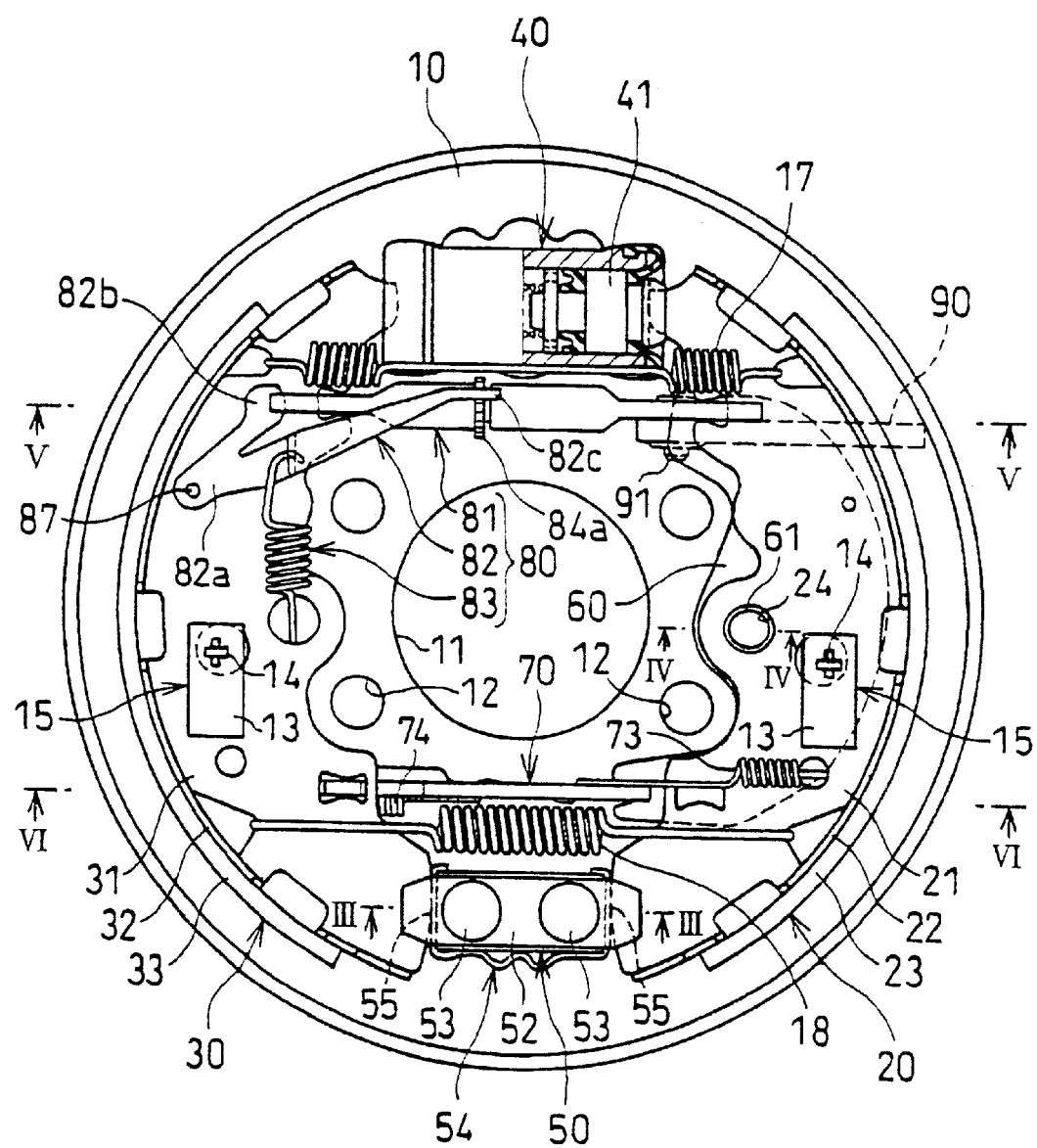
FIG. 1 is a plan view of the dual mode drum brake device of Embodiment 1 of this invention.

FIG. 1 shows a plan view of a dual mode drum brake device, where a back plate 10 has a center hole 11 freely fitting over the wheel axle and is fixed on the immovable part of the vehicle by bolts fastened at installation holes 12. A pair of brake shoes 20, 30 are designed to comprise shoe webs 21, 31 and shoe rims 22, 32, wherein the shoe web 21, 31 and the shoe rim 22, 32 are respectively connected to form a T-shape in the cross-section and linings 23, 33 are fixed on the shoe rims 22, 32. The two brake shoes 20, 30 are arranged to face each other and are held on the back plate 10 by shoe hold mechanisms 15 which can comprise, for example, a commonly known plate spring 13 and pin 14 arrangement.

A service brake actuator 40 is provided between the facing upper ends of the shoe webs 21, 31 and is fixed on the upper portion of the back plate 10 by bolts. The service brake actuator 40 is a hydraulic type wheel brake cylinder and is arranged so that each of two built-in pistons 41 (the left side is omitted in the Figure) abuts against the upper end of the shoe web 21 and the upper end of the shoe web 31, respectively.

An anchor block 50 is fixed at the other side of the back plate from the service brake actuator 40. That is, the anchor block 50 is fixed at a lower portion of the back plate 10 so as to support the lower ends of the shoe webs 21, 31.

Figure 2:
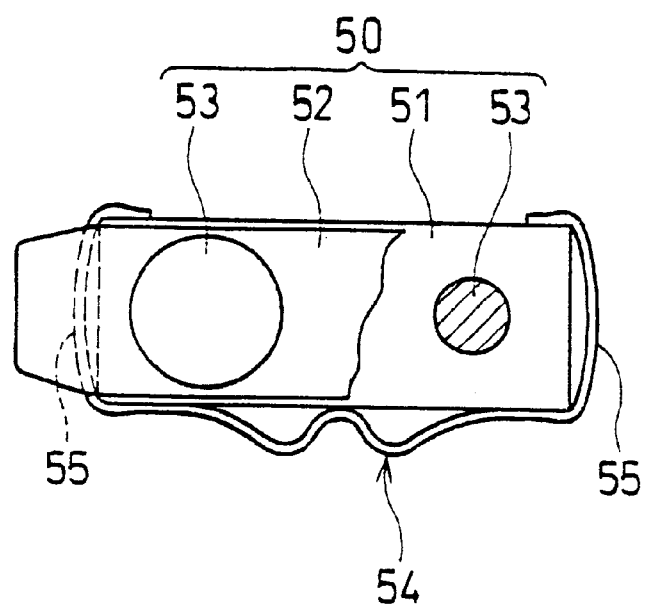
FIG. 2 is a partial plan view of an anchor block.
Figure 3:
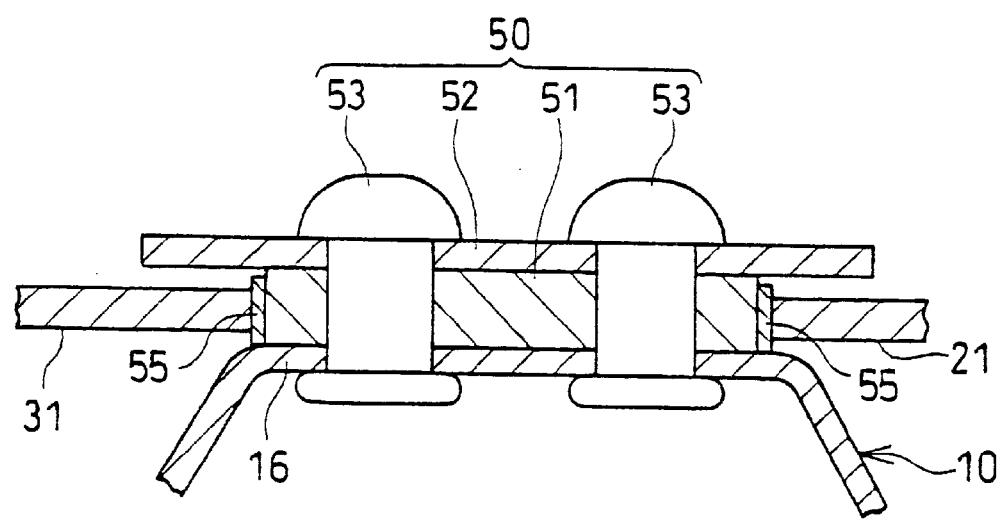
FIG. 3 is a cross-section view of FIG. 1 taken along the line III—III.

As shown in FIGS. 2, 3, the anchor block 50 is mounted on a protuberance 16 formed on the back plate 10. The anchor block 50 comprises a rectangle supporting plate 51 supporting each lower end of the shoe webs 21, 31, a guiding plate 52 restricting the lifting the shoe webs 21, 31 off from the back plate 10, and rivets 53, 53 guided through and forged to connect the supporting plate 51, the guiding plate 52, and the back plate 10 with each other. Members such as the guiding plate 52 and the rivet 53, which are the components of the anchor block 50, are not prerequisites for this invention. For example, the purpose of this invention may be accomplished by integrally forming the supporting plate 51 and the guiding plate 52, welding these two members to the back plate 10, or by other solutions which would be readily apparent to those of skill in the art.

Each lower end of the two shoe webs 21, 31 may directly abut against the side surface of the supporting plate 51 to support the shoe. However, as illustrated in this embodiment, each lower end of the shoe webs 21, 31 may indirectly abut against the side surface of the supporting plate 51 with an elastic cushioning member 54 in between so as to elastically support the same.

As shown in FIG. 2, the cushioning member 54 may be formed by bending a plate spring in a C-shape shape or rectangular with one open side so as to be able to be attached to the circumference of the supporting plate 51. Left and right spring portions 55, 55 are integrally formed as the parts of the cushioning member 54. The spring portions 55, 55 of the cushioning member 54 are elastically deformed when the lower ends of the shoe webs 21, 31 press the supporting side surfaces of the supporting plate 51. Both spring portions 55, 55 absorb the impact force and suppress any impact noise, resulting from the collision between the lower ends of the shoe webs 21, 31 and the supporting plate 51.

This drum brake device is equipped with a pivot lever 60 (FIGS. 1 and 4) in order to function as a duo servo type (DS type) device when a parking brake is applied. The pivot lever 60 is superimposed under the shoe web 21 of one brake shoe 20, and its central region pivotally mounts on the shoe web 21.

Figure 4:
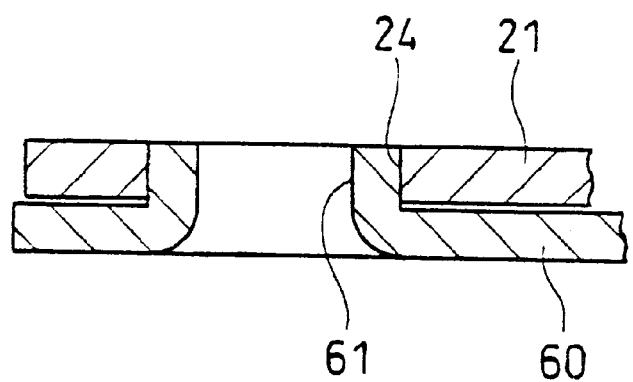
FIG. 4 is a cross-section view of FIG. 1 taken along the line IV—IV.

FIG. 4 shows an embodiment of a pivot structure in which a protuberance 61 integrally formed on the pivot lever 60 by pressing is smoothly movably fitted in a central hole 24 of the shoe web 21. However, the protuberance may be alternatively formed on the shoe web 21 while the central hole may be formed in the pivot lever 60. Alternatively, a pivot structure with a combination of a pin (not shown in the Figures), a pivot lever, and a shoe web may be employed instead of the pivot structure of the above-explained protuberance 61 and the central hole 24.

The upper end of the pivot lever 60 functionally engages with the parking brake actuator (comprising a later-described brake lever 90) while the lower end functionally engages with the left side of a strut 70 which extends between the other brake shoe 30 and the pivot lever 60.

Return springs 17, 18 are stretched between the upper sides and between the lower sides of the brake shoes 20, 30. Portions near the upper ends of the shoe webs 21, 31 abut against a later described shoe clearance adjustment device 80. The lower ends of the shoe webs 21, 31 abut against the supporting surface of the anchor block 50.

A mounting load of the shoe return springs 17, 18 is designed so that one adjacent facing ends of the brake shoes 20, 30 at the anchor block 50 side may not separate prior to the other adjacent facing ends thereof at the service brake actuator 40 side when activating a parking brake. Details of this shoe retraction spring arrangement are disclosed in the prior applications of the applicant, e.g., the European Laid-Open Patent Publication Number EP0800014A2 and EP0836027A2, and the disclosures of which are incorporated by reference.

Figure 5:
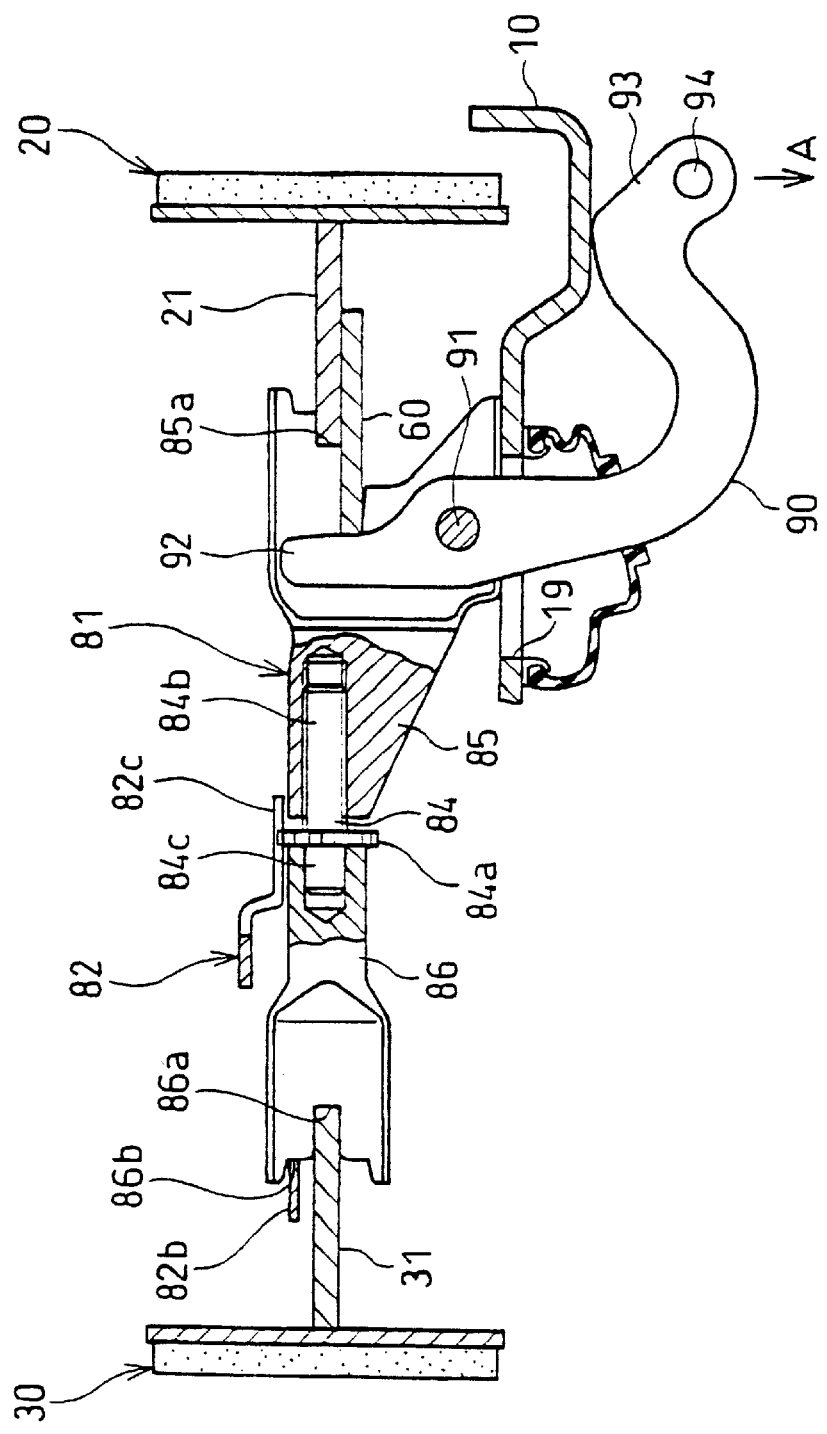
FIG. 5 is a cross-section view of FIG. 1 taken along the line V—V.

FIGS. 1 and 5 illustrate an example of an incremental type automatic shoe clearance adjustment device which is activated upon an application of a service brake. The automatic shoe clearance adjustment device 80 may comprise an extendible commonly known screw type strut (shoe clearance adjustment device) 81, an adjustment lever 82 pivotally supported on the left brake shoe 30, and an adjustment spring 83. The shoe clearance adjustment device 80 is arranged to be adjacent to the service brake actuator 40 and is extended between both shoe webs 21, 31.

As shown in FIG. 5, the strut 81 comprises an adjustment bolt 84, an adjustment nut 85, and an adjustment sleeve 86. Adjustment teeth 84a are integrally formed on the middle of the adjustment bolt 84. A male screw stem 84b at the right side of the adjustment bolt 84 is screwed into the adjustment nut 85 while the stem 84c at the left side rotatably fits into the adjustment sleeve 86.

Outer ends of the above-described adjustment nut 85 and the adjustment sleeve 86 are formed as a plate shaped portion with notched grooves 85a, 86a. The stepped surface of the notched groove 85a on the right side of the adjustment nut 85 crosses and abuts against the bottom of the notched groove of the right shoe web 21 and the notched groove 85a holds the upper end of the pivot lever 60. The bottom of the notched groove 86a on the left side of the adjustment sleeve 86 crosses and abuts against the bottom of the notched groove of the left shoe web 31.

A pivot portion 82a of the adjustment lever 82 is pivotally supported on the left shoe web 31 with the pin 87 as the fulcrum (see FIG. 1). One arm 82b of the adjustment lever 82 abuts against a stepped surface 86b of the notched groove 86a on the adjustment sleeve 86 while the other arm 82c engages with the adjustment teeth 84a of the adjustment bolt 84 (see FIG. 5).

The adjustment spring 83 is stretched between the adjustment lever 82 and the left shoe web 31. In FIG. 1, the adjustment spring 83 applies a clockwise acting force to the adjustment lever 82 with the pin 87 as the fulcrum.

The strut 70 is a one shot type automatic stroke adjustment device and is arranged adjacent to the anchor block 50. The strut 70 as shown with reference to FIGS. 1 and 6 comprises an adjustment plate 71, a bell crank lever 72, and two springs 73, 74.

The bottom of a notched groove 71a formed on the adjustment plate 71 at the right side of the Figures crosses and abuts against the bottom of the notched groove on the lower end of the pivot lever 60. A central region of the adjustment plate 71 has small teeth 71b. A central region of the bell crank lever 72 is pivotally supported at the left side of the adjustment plate 71 by a pin 75 piercing through an elongated hole of the adjustment plate 71. Because the pin 75 is located in the elongated hole with a longitudinal space, the central region of the bell crank lever 72 is movable in the longitudinal direction of the adjustment plate 71 along the plate surface. Small teeth 72b formed on a peripheral surface of a sector arm 72a at one side of the bell crank lever 72 engage with the small teeth 71b of the adjustment plate 71.

Also, another arm 72c of the bell crank lever 72 having a cam surface freely fits into a substantially rectangular hole 35 formed on the left shoe web 31 with a clearance δ1 at its right side. There should also be a small clearance at the left side of the rectangular hole 35, to avoid interference with associated parts due to manufacturing tolerances of each associated member.

In addition to the above embodiment with a clearance at the left side of the rectangular hole 35 for compensating for manufacturing tolerances, a clearance may be reserved between the upper strut 81 and the right shoe web 21.

An anti-rattle spring 73 is stretched between the right shoe web 21 and the adjustment plate 71. A quadrant spring 74 is stretched between the adjustment plate 71 and the pin 75. A mounting load of these springs 73, 74 is designed so that the mounting load of the anti-rattle spring 73 may be greater.

In FIG. 1, the anti-rattle spring 73 applies an acting force via the strut 70 to the pivot lever 60 rotating counterclockwise with the pivot section relative to the shoe web 21. As a result, the anti-rattle spring 73 functions to prevent vibration of each member, i.e., the pivot lever 60, the strut 70 and the later described brake lever 90.

In addition, a spring force of the anti-rattle spring 73 and the adjustment spring 83 toward the shoe clearance adjustment device, constituted by the strut 81, is designed so that the force of the adjustment spring 83 may be greater. This is because the strut 81 and the pivot lever 60 follow the opening of the right brake shoe 20 when the service brake is activated. At the same time, the strut 70 at the anchor block 50 side moves rightward in consort with the right brake shoe 20 with a spring force of the anti-rattle spring 73. A structural characteristic of this invention is in that the parking brake actuator is arranged at the service brake actuator 40 side.

A cross-pull type parking brake actuator, which activates upon an activation of the parking brake, is disclosed in FIG. 5. An almost L-shaped brake lever 90 is pivotally supported on the adjustment nut 85 with a pin 91. A finger-shaped operational portion 92 of the brake lever 90 slightly abuts against the upper inner circumferential surface of the pivot lever 60.

Another arm 93 of the brake lever 90 is projected out from the brake assembly through a hole 19 formed in the back plate 10. In order to spread open the brake shoes 20, 30, a parking brake cable (not shown in the Figures) connected to a parking cable connecting hole 94 is pulled in the direction of A almost at a right angle relative to the back plate 10. In addition, an initial position of the brake lever 90 is restricted by a portion of the arm 93 abutting against the back plate 10.

As is evident from the above, the hole 19 of the back plate 10 is designed to be located away from the anchor portion, where the section requires the greatest strength and also is designed to be located away from the road surface. Further, the parking brake cable may be connected to the brake lever 90 after the drum brake device has been mounted on the vehicle.

The operation of the dual mode drum brake device is explained below.

In FIG. 1, when the service brake actuator 40 activates the pistons 41 outwardly, the upper ends of both brake shoes 20, 30 spread open with the points of abutment against the anchor block 50 as the fulcrum. Then, the linings 23, 33 frictionally engage with the rotating brake drum (not shown in the Figure). At this time, either one of the brake shoes 20 or 30 generates a self-servo effect while the other does not generate a self-servo effect, thereby functioning as a stable LT type brake.

Parking brake operation is explained below where the rotational direction of unidentified parts should be referred to FIG. 1.

As shown in FIG. 5, the other arm 93 of the brake lever 90, which is projecting out from the brake assembly, is pulled in the direction of A, i.e., almost at a right angle relative to the back plate 10. The brake lever 90 rotates clockwise with the pin 91 as the fulcrum, and the finger-shaped operational portion 92 pushes the upper inner circumferential surface of the pivot lever 60 outwardly. Then, as shown in FIG. 1, the pivot lever 60 rotates clockwise with the pivot point with the shoe web 21 as the fulcrum.

The lower end of the pivot lever 60 is supported at the lower portion of the left brake shoe 30 via the strut 70, therefore, the acting force applied at the upper portion of the pivot lever 60 affects the pivot section with the shoe web 21.

At this time, the spring force of both return springs 17 and 18 affecting the brake shoe 20 is designed so that the mounting load of the lower return spring 18 may be greater. The acting force is transmitted to the right shoe web 21 via the pivot section with the pivot lever 60. Then, the right brake shoe 20 spreads open with the points of abutment against the anchor block 50 as the fulcrum, thereby pressing against the brake drum (not shown in the Figure).

Further, the pulling force of the brake lever 90 in FIG. 5 is applied to the strut 81 at the service brake actuator 40 side via the pin 91, thereby shifting the strut 81 leftwards. The acting force via the strut 81 is transmitted to the left shoe web 31, and the left brake shoe 30 opens with the point of abutment against the anchor block 50 as the fulcrum, thereby pressing against the brake drum (not shown in Figure).

If the brake drum (not shown in Figure) rotates clockwise, the frictional force of the left brake shoe 30 is transmitted to the right brake shoe 20 via the strut 81. In this case the lower end of the brake shoe 20 is supported by the anchor block 50, thereby generating a braking force. Therefore, both brake shoes 20, 30 have self-servo effects functioning as a highly effective DS type brake.

In addition, if the brake drum rotates counterclockwise, the frictional force of the right brake shoe 20 is transmitted to the left brake shoe 30 via the strut 81. Accordingly, the lower end of the brake shoe 30 is supported by the anchor block 50, thereby functioning as a DS type brake as well.

As is evident from the above description, even upon an activation of the parking brake, the abutment between the end of brake shoe 20 or 30 supported by the anchor block 50 and the anchor block 50 is maintained. Accordingly, no impact load or impulse is applied to the anchor block 50.

Also, if the brake shoes 20 or 30 which were separated from the anchor block 50 during the parking brake operation are quickly returned onto their abutment surface when the parking brake is released, the spring portions 55, 55 of the cushioning material 54 covering the anchor block 50 absorb the impact force on the lower ends of the shoe webs 21, 31, thereby suppressing impact noise.

In FIGS. 1 and 5, if both brake shoes 20, 30 spread open upon an activation of the service brake, the strut 81 moves in consort with the right brake shoe 20 by a spring force of the adjustment spring 83. At this time, the other arm 82c of the adjustment lever 82 (shown in FIG. 1) rotates clockwise with the pin 87 as the fulcrum to the amount of the movement of the pin 87 and the strut 81.

Now, when the linings 23, 33 become worn and then the amount of rotation of the other arm 82c on the adjustment lever 82 exceeds a pitch of the adjustment teeth 84a, the adjustment bolt 84 is rotated to be screwed out from the adjustment nut 85. Therefore, this adjusting function always and automatically guarantees the constant clearance between the brake drum (not shown in the Figure) and the linings 23, 33. That is, an application stroke for the service brake is maintained constant.

Figure 6:
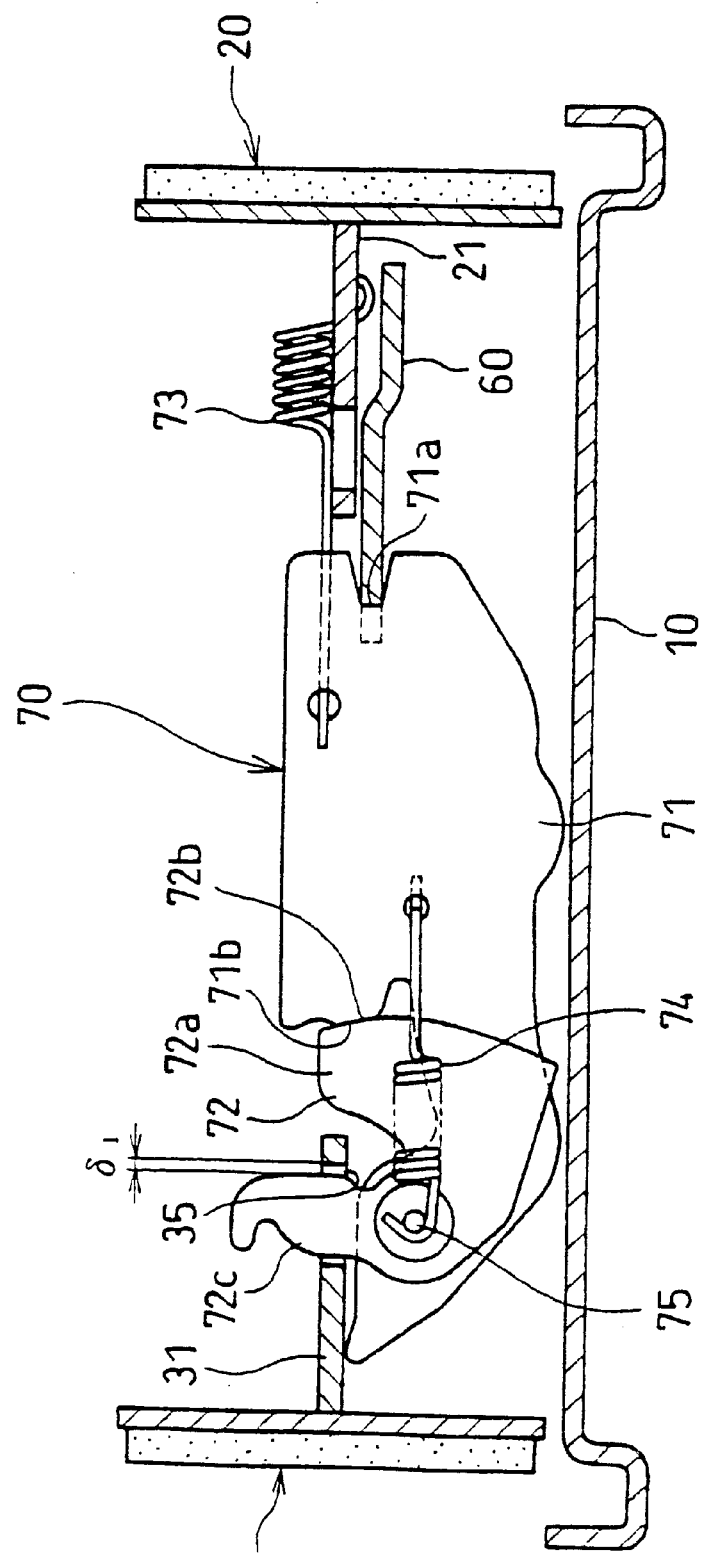
FIG. 6 is a cross-section view of FIG. 1 taken along the line VI—VI.

In FIGS. 1 and 6, when both brake shoes 20, 30 spread open by activating the service brake, the strut 70 and the pivot lever 60 at the anchor block 50 side move almost in consort with the right brake shoe 20 because of the relation of the spring force of the adjustment spring 83 and the anti-rattle spring 73. During the movement, the upper portion of the pivot lever 60 is elastically abutting against the strut 81.

When the linings 23, 33 of the brake shoes 20, 30 become worn to the point where the amount of brake shoe opening exceeds the value of the clearance δ1 of the cam arm 72c of the bell crank lever 72 plus height of the small teeth 72b, the bell crank lever 72 rotates counterclockwise with the pin 75 as the fulcrum, thereby extending the strut 70 by one pitch. Therefore, the clearance δ1 of the cam arm 72c is always maintained constant with the condition that the upper portion of the pivot lever 60 is abutting against the strut 81.

In addition, the spring force of the anti-rattle spring 73 is always being applied to the pivot lever 60 and the strut 70. Therefore, no vibration causing an impact noise is generated whether during braking or in other states of operation, thereby eliminating an uncomfortable and unsecure feeling being provided to the driver.

Embodiment 2

Figure 7:
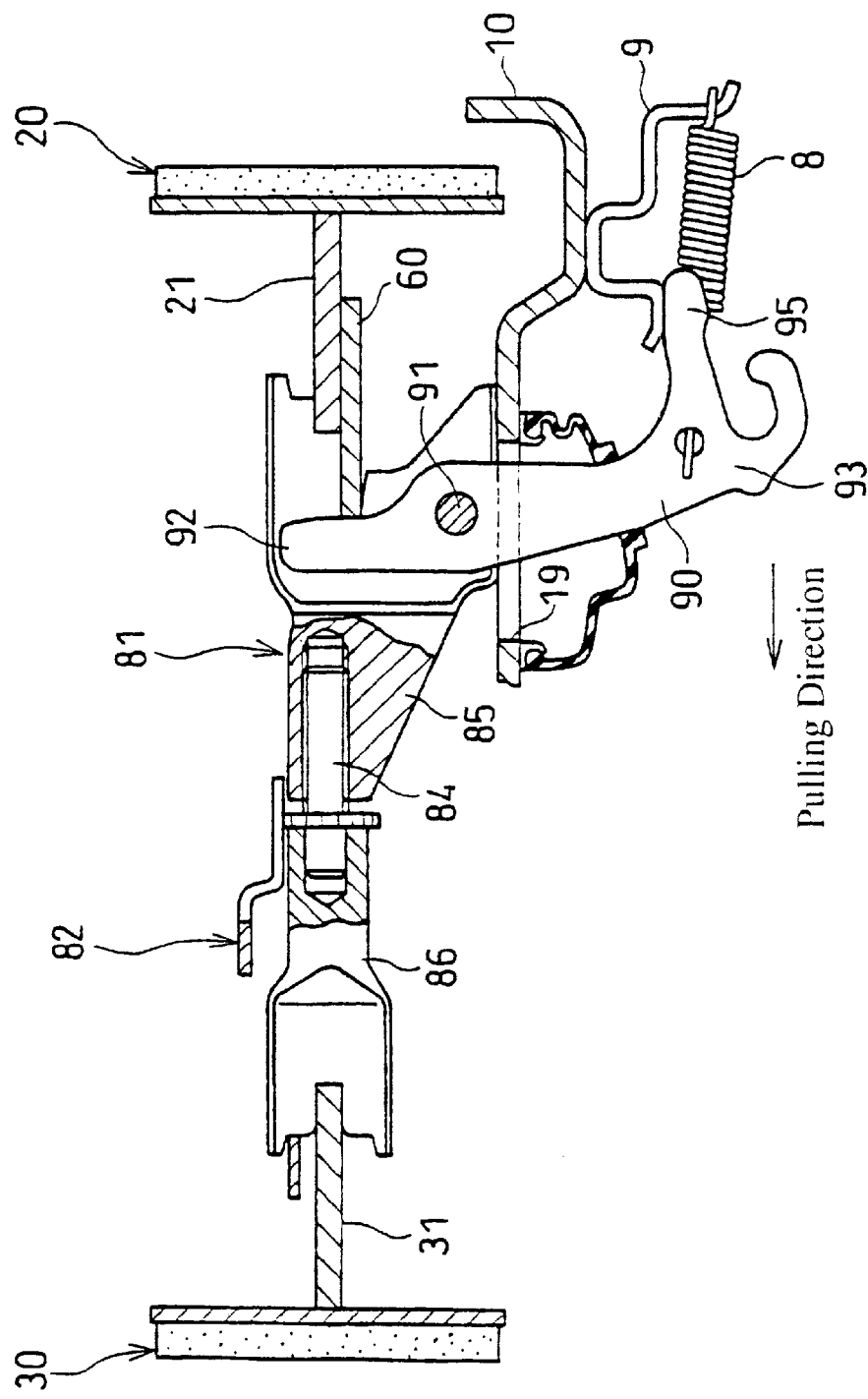
FIG. 7 is a cross-section view similar to FIG. 5 illustrating a modification of the brake lever.

FIG. 7 shows a cross section of a different embodiment of the parking brake lever. The direction of pulling the parking brake cable is different from Embodiment 1. Here, identical reference numbers are assigned to the same parts as in the Embodiment 1 and the explanations thereof are omitted.

In this embodiment, the brake lever 90 is an almost I shape, and the other arm 93 projects out from the brake through the hole 19 of the back plate 10. Further, the pair of brake shoes 20, 30 are designed to spread open by pulling the brake lever 90 in a direction almost parallel to the back plate 10.

An extended portion 95 of the other arm 93 may abut against a supporting plate 9 arranged to be at the reverse side of the back plate 10, thereby restricting the initial position of the brake lever 90. In addition, a cable return spring 8 in the FIG. 7 can be stretched between the supporting plate 9 and the brake lever 90. However, the return spring 8 is not a prerequisite for this invention.

This invention should not be limited to what is described in the above Embodiments. For instance, a one shot type automatic shoe clearance adjustment device may be employed at the service brake actuator 40 side as well as at the anchor block 50 side. An incremental type or a one shot type may be applicable to the automatic shoe clearance adjustment device as well as the automatic stroke adjustment device. Further, the brake lever 90, one component of the parking brake actuator, may be arranged at the adjustment sleeve 86 side.

As such, this invention has the following advantages:

A parking brake actuator, which activates upon an activation of a parking brake, is arranged to be adjacent to a service brake actuator which activates upon an activation of a service brake actuator. This solves a problem of weakening the back plate strength near the anchor block. Therefore, additional reinforcements are not necessary. Ultimately, this results in reduction of the weight and cost of the device.

The parking brake actuator is arranged to be adjacent to the service brake actuator. The parking brake cable may be arranged on the part of the back plate away from the road surface. This remarkably reduces the danger of damage to the parking brake cable by flying gravel.

An operating portion of the parking brake lever is projected out from the brake. This facilitates the effort for connecting of the parking brake cable and assembly of the brake device.

A cushioning member is arranged between the anchor block and the brake shoe. This suppresses the impact noise generated when the lower end of the brake shoe collides against the anchor block when releasing the parking brake.

A resistance force against the opening of the brake shoe upon an application of the parking brake is designed to be greater at the anchor block side of the brake shoe than at the service brake actuator side of the brake shoe. This prevents the opening of the brake shoe at the anchor block side upon an activation of the parking brake prior to the opening of the brake shoe at the service brake actuator side. No impact noise is generated even if either one of the brake shoes rotates in consort with the brake drum, thereby avoiding an uncomfortable and unsecure feeling being given to the driver. Further, this invention gives an advantage for designing the strength near the anchor block since no impact load is generated, thereby eliminating the need of consideration of this effect.

An incremental type or a one shot type is applicable to an automatic stroke adjustment device as well as an automatic shoe clearance adjustment device. This expands the scope of applicability and enables to commonly design the parts.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A dual mode drum brake device comprising:

a pair of brake shoes provided on a back plate to face each other;

a service brake actuator which is adapted to be activated upon an activation of a service brake arranged between adjacent upper face ends of said brake shoes;

an anchor block arranged between adjacent lower facing ends of said brake shoes;

a pivot lever arranged such that a central region of said pivot lever is pivotally mounted at a central region of one of the brake shoes;

a shoe clearance adjustment device arranged adjacent to the service brake actuator and extending between said pair of brake shoes and functionally engaging the upper portion of said pivot lever; and a strut extended between the lower portion of said pivot lever and the other one of said brake shoes and functionally engaging with the lower portion of said pivot lever;

said brake shoes being designed to be able to spread open upon an activation of a parking brake, wherein;

a duo-servo type parking brake actuator which has a parking brake lever and is adapted to be activated upon activation of said parking brake is arranged adjacent to the service brake actuator opposite the anchor block; and an operating portion of said parking brake lever extends outside the brake device through said back plate.

2. A dual mode drum brake device as claimed in claim 1, wherein:

said operating portion of the parking brake actuator which activates upon the activation of said parking brake is arranged to be movable in a direction at an almost right angle relative to said back plate.

3. A dual mode drum brake device as claimed in claim 1, wherein:

said operating portion of the parking brake actuator which activates upon the activation of said parking brake is arranged to be movable in a direction almost parallel to said back plate.

4. A dual mode drum brake device as claimed in claim 1, wherein:

a cushioning member is arranged between said anchor block and said brake shoes.

5. A dual mode drum brake device as claimed in claim 2, wherein:

a cushioning member is arranged between said anchor block and said brake shoes.

6. A dual mode drum brake device as claimed in claim 3, wherein:

a cushioning member is arranged between said anchor block and said brake shoes.

7. A dual mode drum brake device as claimed in claim 1, wherein:

a protuberance is integrally formed by pressing on said central region of the pivot lever or on said central region of said one of the brake shoes; and said protuberance is pivotally supported in a hole which is provided either on said one of the brake shoes or said pivot lever.

8. A dual mode drum brake device as claimed in claim 2, wherein:

a protuberance is integrally formed by pressing on said central region of the pivot lever or on said central region of said one of the brake shoes; and said protuberance is pivotally supported in a hole which is provided either on said one of the brake shoes or said pivot lever.

9. A dual mode drum brake device as claimed in claim 3, wherein:

a protuberance is integrally formed by pressing on said central region of the pivot lever or on said central region of said one of the brake shoes; and said protuberance is pivotally supported in a hole which is provided either on said one of the brake shoes or said pivot lever.

10. A dual mode drum brake device as claimed in claim 1, wherein:

when a central pivot section of said pivot lever is a pivot point, a resistance force against the opening of said brake shoes during a parking brake operation is designed to be greater on a side of the brake shoes adjacent the anchor block than on a side of the brake shoes adjacent the service brake actuator.

11. A dual mode drum brake device as claimed in claim 2, wherein:

when a central pivot section of said pivot lever is a pivot point, a resistance force against the opening of said brake shoes during a parking brake operation is designed to be greater on a side of the brake shoes adjacent the anchor block than on a side of the brake shoes adjacent the service brake actuator.

12. A dual mode drum brake device as claimed in claim 3, wherein:

when a central pivot section of said pivot lever is a pivot point, a resistance force against the opening of said brake shoes during a parking brake operation is designed to be greater on a side of the brake shoes adjacent the anchor block than on a side of the brake shoes adjacent the service brake actuator.

13. A dual mode drum brake device as claimed in claim 1, wherein:

said shoe clearance adjustment device extended between said brake shoes is adapted to automatically extend when sensing an excessive amount of opening of said pair of brake shoes during a service brake operation and to adjust clearance between a brake drum and linings of said brake shoes.

14. A dual mode drum brake device as claimed in claim 2, wherein: said shoe clearance adjustment device extended between said brake shoes is adapted to automatically extend when sensing an excessive amount of opening of said pair of brake shoes during a service brake operation and to adjust clearance between a brake drum and linings of said brake shoes.

15. A dual mode drum brake device as claimed in claim 3, wherein:
said shoe clearance adjustment device extended between said brake shoes is adapted to automatically extend when sensing an excessive amount of opening of said pair of brake shoes during a service brake operation and to adjust clearance between a brake drum and linings of said brake shoes.

16. A dual mode drum brake device as claimed in claim 1, wherein:
said strut extended between the lower portion of said pivot lever and the lower portion of the other one of said brake shoes is adapted to automatically extend when sensing an excessive amount of opening of said pair of brake shoes and said pivot lever during service brake operation and to adjust an application stroke of said parking brake actuator.

17. A dual mode drum brake device as claimed in claim 2, wherein:
said strut extended between the lower portion of said pivot lever and the lower portion of the other one of said brake shoes is adapted to automatically extend when sensing an excessive amount of opening of said pair of brake shoes and said pivot lever during service brake operation and to adjust an application stroke of said parking brake actuator.

18. A dual mode drum brake device as claimed in claim 3, wherein:
said strut extended between the lower portion of said pivot lever and the lower portion of the other one of said brake shoes is adapted to automatically extend when sensing an excessive amount of opening of said pair of brake shoes and said pivot lever during service brake operation and to adjust an application stroke of said parking brake actuator.

19. A dual mode drum brake device comprising:
a pair of brake shoes operatively provided on a back plate facing each other;
a service brake actuator arranged between adjacent upper face ends of said brake shoes, whereupon activation of a service brake, said service brake actuator forces apart said upper face ends of said brake shoes;
an anchor block arranged between adjacent lower face ends of said brake shoes;
a pivot lever pivotally mounted to a central region of a first one of said brake shoes;
a shoe clearance adjustment device arranged adjacent said service brake actuator and extending between and engaging upper portions of said pair of brake shoes; and
a strut extended between the lower portion of said pivot lever and said lower face end of a second one of said pair of brake shoes and functionally engaging with the lower portion of said pivot lever;
a duo-server type parking brake actuator disposed adjacent said service brake actuator and provided to selectively force apart said lower face ends of said pair of brake shoes; and said parking brake actuator including;
a parking brake lever pivotally mounted to said shoe clearance adjustment device and engaging said upper portion of said pivot lever.

20. The device according to claim 19, wherein upon rotation of said parking brake lever, said shoe clearance adjustment device and said pivot lever to move relative to each other such that said lower face ends of said pair of brake shoes move apart and away from said anchor block.

21. The device according to claim 19, wherein said parking brake lever pivots in a plane substantially perpendicular to said back plate.

22. The device according to 21, wherein said parking brake lever has an arm projecting through a hole located through an upper portion of said back plate, said arm being operatively connected to a parking cable for selective activation of said parking brake actuator.

\* \* \* \* \*

UNITED STATES PATENT AND TRADEMARK OFFICE
CERTIFICATE OF CORRECTION

PATENT NO.    : 6,390,248 B1  
DATED         : May 21, 2002  
INVENTOR(S)   : Ikeda It is certified that error appears in the above-identified patent and that said Letters Patent is hereby corrected as shown below:

<u>Title page,</u>
Item [30], insert:

-- [30] Foreign Application Priority Data
February 23, 1999   (JP)………………………..11-45159 --

Signed and Sealed this

Nineteenth Day of November, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,390,248 B1
DATED : May 21, 2002
INVENTOR(S) : Takashi Ikeda

Figure 8:
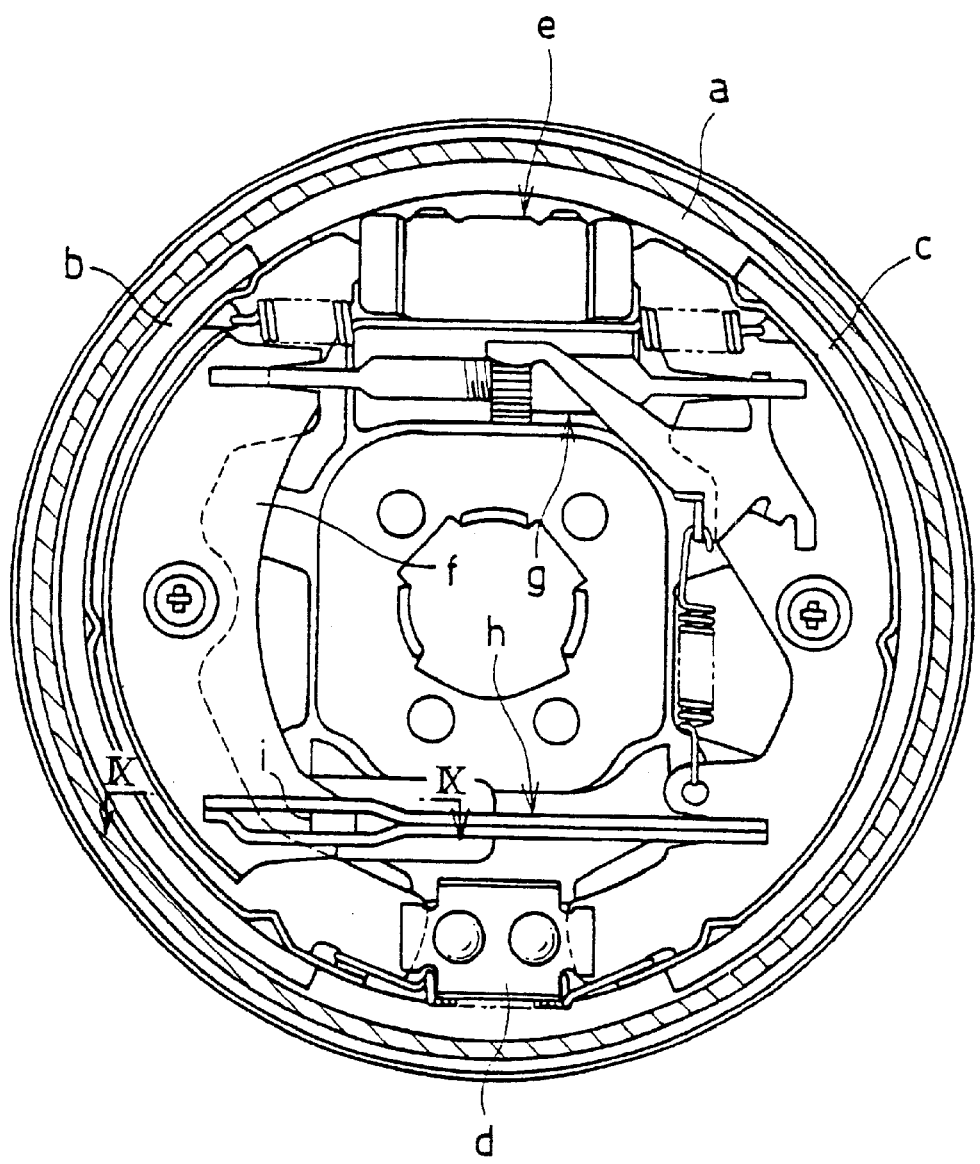
FIG. 8 is a plan view of the conventional dual mode drum brake device.
Figure 9:
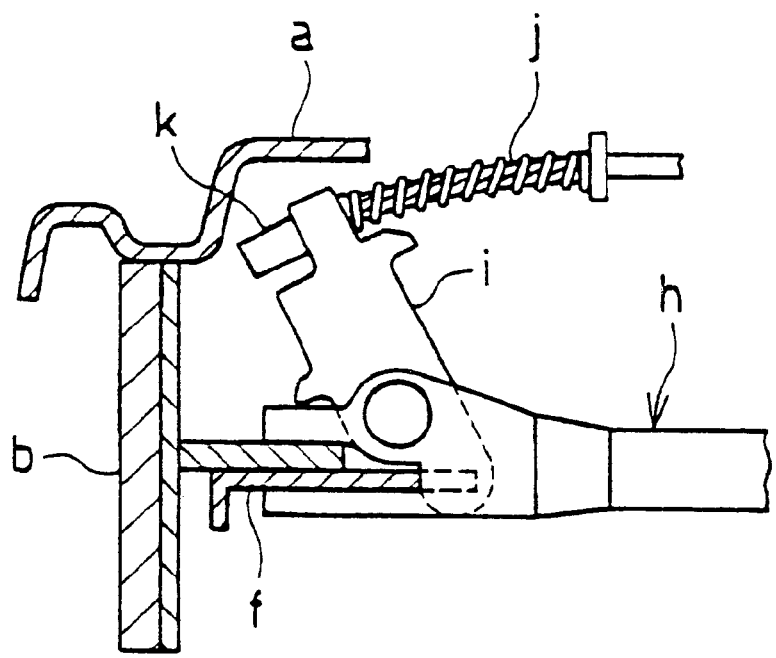
FIG. 9 is a cross-section view of FIG. 8 taken along the line IX—IX.

It is certified that error appears in the above-identified patent and that said Letters Patent is hereby corrected as shown below:

<u>Drawings,</u>
Figures 8 & 9, should be labeled as -- prior art --.

<u>Column 12,</u>
Lines 1-26, Claim 19, should read as follows:

19. A dual mode drum brake device comprising:

a pair of brake shoes operatively provided on a back plate facing each other;

a service brake actuator arranged between adjacent upper face ends of said brake shoes, whereupon activation of a service brake, said service brake actuator forces apart said upper face ends of said brake shoes;

an anchor block arranged between adjacent lower face ends of said brake shoes;

a pivot lever pivotally mounted to a central region of a first one of said brake shoes;

a shoe clearance adjustment device arranged adjacent said service brake actuator and extending between and engaging upper portions of said pair of brake shoes; and a strut extended between the lower portion of said pivot lever and said lower face end of a second one of said pair of brake shoes and functionally engaging with the lower portion of said pivot lever;

a duo server duo-serve type parking brake actuator disposed adjacent said service brake actuator and provided to selectively force apart said lower face ends of said pair of brake shoes; and said parking brake actuator including;

UNITED STATES PATENT AND TRADEMARK OFFICE
CERTIFICATE OF CORRECTION

PATENT NO. : 6,390,248 B1
DATED : May 21, 2002
INVENTOR(S) : Takashi Ikeda

It is certified that error appears in the above-identified patent and that said Letters Patent is hereby corrected as shown below:

<u>Column 12, cont'd,</u>
A parking brake lever pivotally mounted to said shoe clearance adjustment device and engaging said upper portion of said pivot lever.

Signed and Sealed this

Twenty-ninth Day of June, 2004

JON W. DUDAS
*Acting Director of the United States Patent and Trademark Office*